Aug. 21, 1928.
O. GESS
1,681,334
LIQUID HEATER
Filed Jan. 19, 1927
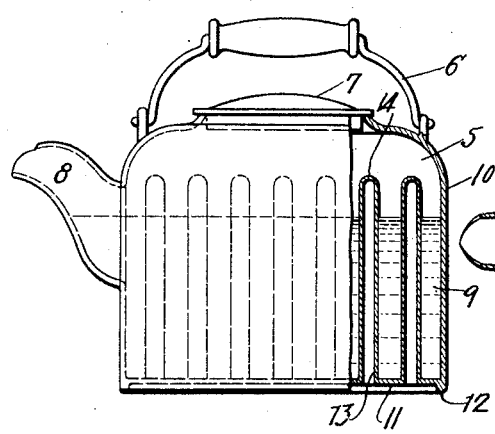
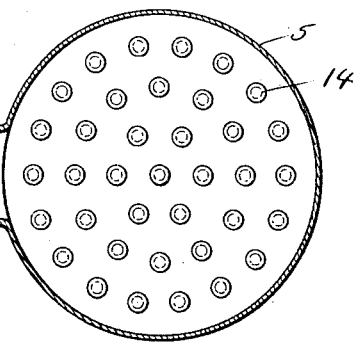
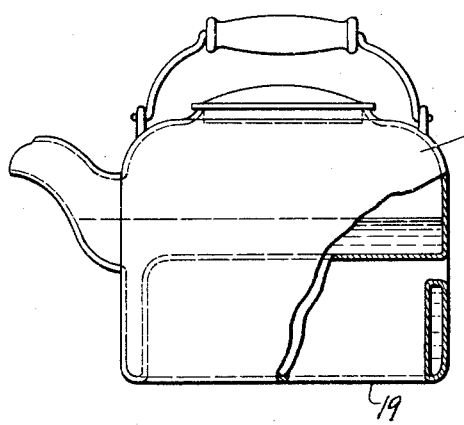
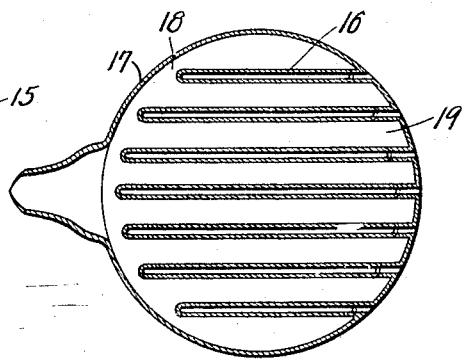
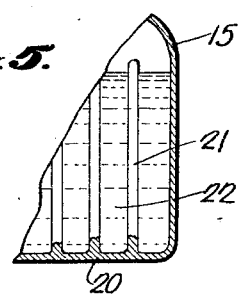
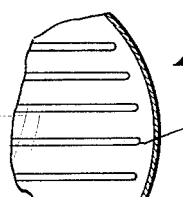
Inventor
OTTO GESS.
By His Attorney
Richard B. Owen Patented Aug. 21, 1928.

1,681,334

UNITED STATES PATENT OFFICE.

OTTO GESS, OF BROOKLYN, NEW YORK.

LIQUID HEATER.

Application filed January 19, 1927. Serial No. 162,109.

This invention relates to heating devices and in particular to one adapted for household use.

A particular object of the invention is to provide a kettle or iron for the heating of water in which the heating surface will be greater in area than in the utensils in present day use.

A further particular object of the invention is to provide a kettle which will hold substantially the same amount of water as has heretofore been contained in water heating kettles but which is so arranged that its heating surface will be surrounded by water so that the same will be heated in a minimum of time thereby saving gas and reducing the operating cost to the user.

A still further object of the invention is to provide an improved method of forming the heating wall of a water heating utensil so that its greatest amount of heating area is presented to the water.

To enable others skilled in the art to fully comprehend the underlying features of my invention that they may embody the same in the various modifications in structure and relation contemplated, a drawing depicting a preferred form has been annexed as a part of this disclosure and in such drawing, similar reference characters denote corresponding parts throughout all the views, of which, Figure 1 is a view in elevation, a part thereof being broken in section of a water heating kettle formed to provide a greater heating area which is one of the objects of my invention.

Figure 2 is a top plan view showing the inwardly projecting bottom wall of the heating utensil, the side wall thereof being shown in section.

Figure 3 is a view similar to Figure 1 showing a modified form of providing in the bottom wall of the heating utensil, increased heating areas.

Figure 4 is a view similar to Figure 2 showing the construction of the bottom of the heating utensil.

Figure 5 is a fragmentary view in sectional elevation showing the use of rib members cast integral with the bottom of the heating utensil to provide a heat transferring means of increased area, and Figure 6 is a fragmentary top plan view of the construction shown in Figure 5.

Referring to the drawing in detail 5 indicates a kettle provided with the usual bail 6 and lid 7, the spout being illustrated as at 8 and forming a medium through which the kettle may be emptied of its fluid contents 9.

The kettle proper, comprises the usual body portion 10 which is made of metal and to which is integrally formed the spout 8, the kettle being cast or otherwise provided with the bottom wall 11 which may or may not have the edge bead 12 formed thereon in order that the bottom 11 may be held in spaced relation with the heating surface upon which the kettle is placed.

It has always been a problem in the heating of water to effectively heat a greater amount of water in a lesser time thereby cutting down the cost of the heating means, such as gas, and in order to effectively heat the water, I have conceived the idea of providing in the bottom thereof, upstanding tubular members 13 which are soldered into position in the bottom 11 which has been provided with openings to match said tubular members 13, the top of the tubes being closed as at 14 so that the water in the kettle cannot escape.

It is evident that by providing a plurality of these upstanding tubular portions 13 within the kettle that the heat generated by the gas flame therebeneath will effectively heat the air in the tubes 13 which, in turn, will transfer its heat through the wall of the tube 13 to the liquid 9 and in addition to the effective bottom surface of the bottom 11 which transfers the the heat directly to the body of water, the entire peripheral area of each of the tubes 13 will act as a heat transferring medium and will thereby more quickly heat the water in the kettle than would be possible if the bottom surface 11 alone was relied upon for heat transference.

In Figures 3 and 4, I have illustrated a modified form of providing a greater heating area which consists in providing the kettle 15 with spaced, upstanding, bottom walls 16 which extend longitudinally of the kettle, as illustrated in Figure 4, leaving between the end walls of said upstanding walls and the kettle wall 17, a space 18 through which the water in the kettle may circulate during the heating thereof by the flame which enters the space between the walls 16 and effectively heat longitudinally extending walls 16 about which the water circulates.

It is evident, therefore, that these walls 16 being provided and formed integrally with the bottom wall or bottom 19 of the kettle provide an increased heating area which, being heated by the flame, gives off to a greater volume of water, heat necessary to raise the same to the boiling point.

This particular construction may be used for kettles which are made of copper or other material in which the sides and bottom can be pressed to provide the upstanding walls 16 which act as the heat transferring agents.

In Figures 5 and 6, I have shown the bottom of the kettle 20 cast to provide integral, upstanding walls 21, between which is left the space 22 through which the water circulates and is heated by reason of its contact with said upstanding walls 21, the walls extending longitudinally of the kettle and at their ends being spaced from the side walls of the kettle or urn as at 23 to allow continuous circulation of the water between the walls so that the same will rapidly absorb the heat of the walls 21 which is conducted from the bottom 20 which is in contact with the flame or other heating medium.

It is evident, therefore, that I have provided an improved water heating kettle, the principles of which can be applied to a coffee urn or other liquid heating device, as employed in restaurants and like places and one in which the construction will facilitate the heating of the liquid, due to the fact that the greater heating area presented to the volume of the liquid will more quickly heat the same.

It is also evident that I have provided a kettle, the construction of which will be no more expensive than an ordinary kettle, now in use, and one in which the fuel, such as gas used to supply the heat, will be cut down in the volume necessary to produce the same amount of heat as has heretofore been necessary with the regular water heating kettle.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claim.

Having thus described my invention what I claim as new and desire to secure by United States Letters Patent is:—

A liquid heating vessel comprising a bottom, elongated, slot-like chambers formed in said bottom and having the end walls thereof spaced from the wall of the vessel, the upper portions of one end of the chamber opening to the exterior of the vessel, and said chambers forming communicating water holding compartments in said vessel, the chambers extending lengthwise of the vessel and presenting to the liquid held in the vessel the maximum heating surface.

In testimony whereof I affix my signature.

OTTO GESS. [L. S.]